United States Patent
Takahashi et al.

(10) Patent No.: US 12,090,667 B2
(45) Date of Patent: Sep. 17, 2024

(54) PLANNING SYSTEM, ROBOT SYSTEM, PLANNING METHOD, AND NON-TRANSITORY COMPUTER READABLE STORAGE MEDIUM

(71) Applicant: KABUSHIKI KAISHA YASKAWA DENKI, Kitakyushu (JP)

(72) Inventors: Makoto Takahashi, Kitakyushu (JP); Wataru Watanabe, Kitakyushu (JP); Yutaro Uchida, Kitakyushu (JP); Ryo Kabutan, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 347 days.

(21) Appl. No.: 17/577,326

(22) Filed: Jan. 17, 2022

(65) Prior Publication Data
US 2022/0226997 A1  Jul. 21, 2022

(30) Foreign Application Priority Data
Jan. 19, 2021 (JP) .................. 2021-006285

(51) Int. Cl.
*B25J 9/16* (2006.01)

(52) U.S. Cl.
CPC ............. *B25J 9/1666* (2013.01); *B25J 9/163* (2013.01); *B25J 9/1682* (2013.01)

(58) Field of Classification Search
None
See application file for complete search history.

(56) References Cited

U.S. PATENT DOCUMENTS

| | | | |
|---|---|---|---|
| 2011/0166703 A1* | 7/2011 | Byrne | B25J 9/1682 901/50 |
| 2014/0257558 A1* | 9/2014 | Frische | B25J 9/1664 700/245 |

(Continued)

FOREIGN PATENT DOCUMENTS

| | | |
|---|---|---|
| EP | 3718702 | 10/2020 |
| JP | 2002-116816 | 4/2002 |

(Continued)

OTHER PUBLICATIONS

Chuang Meng et al., "Routing of a Multi-Robot System Using a Time-Space Network Model", Chinese Automation Congress (CAC), IEEE, Nov. 22, 2019, pp. 2883-2888, XP033711755.

(Continued)

*Primary Examiner* — Jonathan L Sample
*Assistant Examiner* — Alan Lindsay Ostrow
(74) *Attorney, Agent, or Firm* — MORI & WARD, LLP (57) ABSTRACT

A planning system includes flow generating circuitry, confirmation circuitry, and update circuitry. The flow generating circuitry is configured to generate a task flow which includes work tasks predetermined based on a concurrent execution constraint with respect to concurrent execution of tasks performed by robots and connection tasks to be connected to the work tasks. The confirmation circuitry is configured to determine whether at least one of the robots interferes with an object in the connection tasks. The update circuitry is configured to update the concurrent execution constraint when the at least one of the robots is determined to interfere with the object.

19 Claims, 9 Drawing Sheets

(56) References Cited

U.S. PATENT DOCUMENTS

| | | | |
|---|---|---|---|
| 2016/0031082 A1* | 2/2016 | Hazan | B25J 9/1664 |
| | | | 700/250 |
| 2016/0129596 A1* | 5/2016 | Pfaff | B25J 9/1682 |
| | | | 700/255 |
| 2017/0263131 A1* | 9/2017 | Blomberg | G08G 5/0013 |
| 2018/0326580 A1* | 11/2018 | Wessén | G05B 19/41885 |
| 2019/0314989 A1 | 10/2019 | Sokabe et al. | |
| 2019/0391597 A1* | 12/2019 | Dupuis | B25J 9/0084 |
| 2020/0306967 A1 | 10/2020 | Takahashi et al. | |

FOREIGN PATENT DOCUMENTS

| | | |
|---|---|---|
| JP | 2020-168666 | 10/2020 |
| WO | WO 2018/143003 | 8/2018 |

OTHER PUBLICATIONS

Extended European Search Report for corresponding EP Application No. 22151996.0-1205, Jun. 15, 2022.

Japanese Office Action for corresponding JP Application No. 2021-006285, Dec. 20, 2022 (w/ English machine translation).

\* cited by examiner

PLANNING SYSTEM, ROBOT SYSTEM, PLANNING METHOD, AND NON-TRANSITORY COMPUTER READABLE STORAGE MEDIUM

CROSS-REFERENCE TO RELATED APPLICATIONS

The present application claims priority under 35 U.S.C. § 119 to Japanese Patent Application No. 2021-006285, filed Jan. 19, 2021. The contents of this application are incorporated herein by reference in their entirety.

BACKGROUND OF THE INVENTION

Technical Field

One aspect of the present disclosure relates to a planning system, a robot system, a planning method, and a non-transitory computer readable storage medium.

Background Art

International Patent Publication No. WO 2018/143003 describes a robot path generation device that generates a path of a robot between a start point and an end point that are arbitrarily set based on a result of a machine learning process based on a data set.

SUMMARY OF THE INVENTION

According to one aspect of the present invention, a planning system includes flow generating circuitry, confirmation circuitry, and update circuitry. The flow generating circuitry is configured to generate a task flow which includes work tasks predetermined based on a concurrent execution constraint with respect to concurrent execution of tasks performed by robots and connection tasks to be connected to the work tasks. The confirmation circuitry is configured to determine whether at least one of the robots interferes with an object in the connection tasks. The update circuitry is configured to update the concurrent execution constraint when the at least one of the robots is determined to interfere with the object.

According to another aspect of the present invention, a robot system includes at least one robot, flow generating circuitry configured to generate a task flow which includes work tasks predetermined based on a concurrent execution constraint with respect to concurrent execution of tasks performed by the at least one robot and connection tasks to be connected to the work tasks, confirmation circuitry configured to determine whether the at least one robot interferes with an object in the connection tasks, update circuitry configured to update the concurrent execution constraint when the at least one robot is determined to interfere with the object, program generating circuitry configured to generate an operation program for causing the at least one robot to execute the task flow when the confirmation circuitry determines the at least one robot does not interfere with the object, and at least one robot controller configured to operate the at least one robot based on the operation program.

According to the other aspect of the present invention, a planning method executed by a planning system including at least one processor includes generating a task flow which includes work tasks predetermined based on a concurrent execution constraint with respect to concurrent execution of tasks performed by robots and connection tasks to be connected to the work tasks; determining whether at least one of the robots interferes with an object in the connection tasks; and updating the concurrent execution constraint when the at least one of the robots is determined to interfere with the object.

According to the other aspect of the present invention, a non-transitory computer readable storage medium is configured to retrievably store a computer-executable program therein. The computer-executable program causes a computer to perform a planning method. The method includes generating a task flow which includes work tasks predetermined based on a concurrent execution constraint with respect to concurrent execution of tasks performed by robots and connection tasks to be connected to the work tasks; determining whether at least one of the robots interferes with an object in the connection tasks; and updating the concurrent execution constraint when the at least one of the robots is determined to interfere with the object.

DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Hereinafter, embodiments of the present disclosure will be described in detail with reference to the accompanying drawings. In the description of the drawings, the same or equivalent elements are denoted by the same reference numerals, and redundant description will be omitted.

[Robot System]

Figure 1:
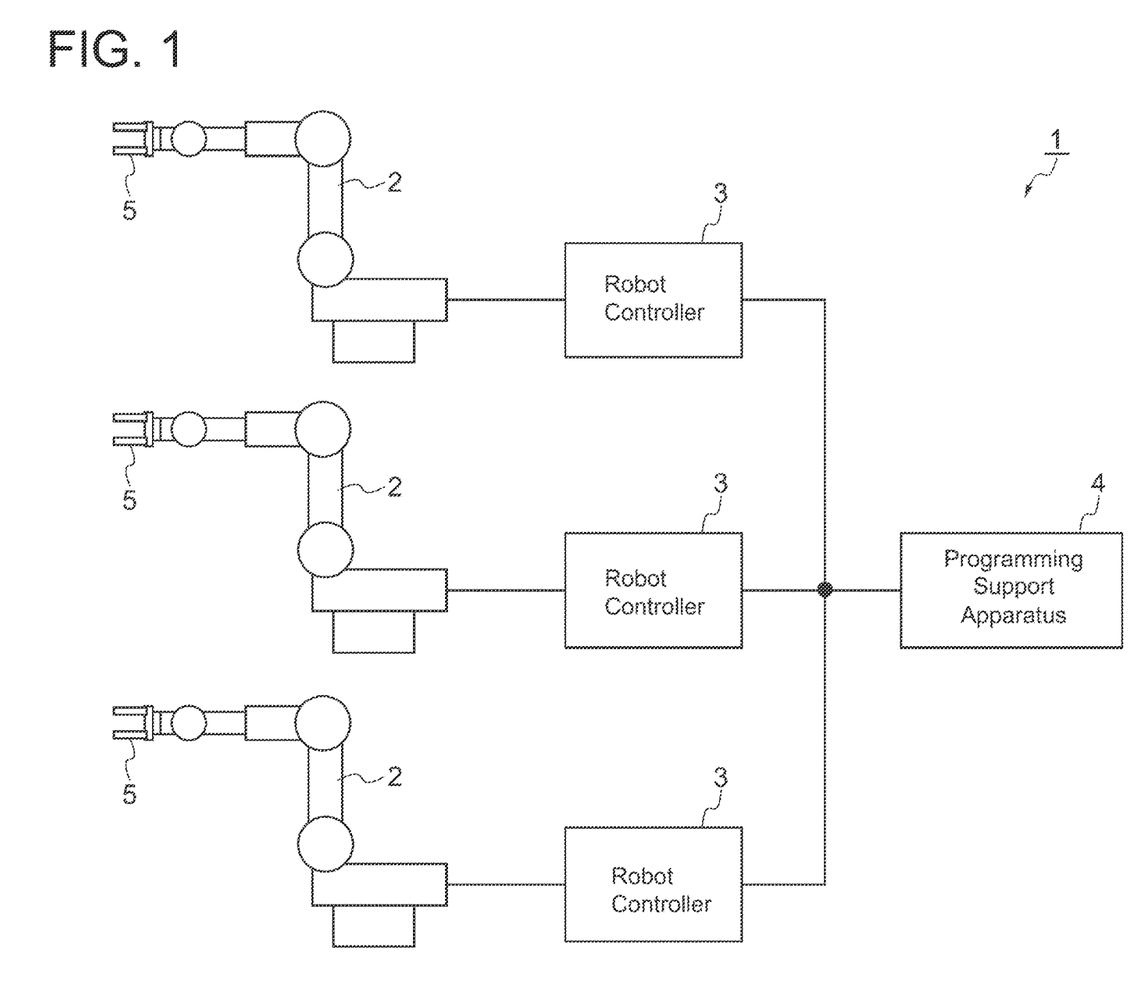
FIG. 1 is a diagram illustrating an example of a configuration of a robot system.

In the present embodiment, the planning system according to the present disclosure is applied to the programming support apparatus 4 of the robot system 1. In the present disclosure, a planning system refers to a computer system for determining an operation of at least one robot. The robot system 1 is a system that automates various operations such as machining and assembly by causing a robot to execute an operation taught by an operator. FIG. 1 is a diagram illustrating an example of a configuration of a robot system 1. In one example, the robot system 1 includes one or more robots 2, one or more robot controllers 3 corresponding to the one or more robots 2, and a programming support apparatus 4. FIG. 1 shows three robots 2 and three robot controllers 3, and shows a configuration in which one robot 2 is connected to one robot controller 3. However, the number of devices and the connection method are not limited to the example shown in FIG. 1. For example, a plurality of robots 2 may be connected to one robot controller 3.

In one example, the robot 2 is a multi-axis serial link type vertical articulated robot, and is configured to be able to execute various processes in a state in which a tool is held at the tip portion 5 thereof. The robot 2 can freely change the position and orientation of the tip portion 5 within a predetermined range. The robot 2 may be a six-axis vertical articulated robot or a seven-axis vertical articulated robot in which one redundant axis is added to six axes. In one example, the plurality of robots 2 are arranged such that any of the robots 2 can perform the same processing on the same workpiece arranged at the same position.

The robot controller 3 is a device that controls the robot 2 in accordance with an operation program generated in advance. In one example, the operation program includes data for controlling the robot 2 and includes, for example, a path indicating a trajectory of the robot 2. The trajectory of the robot 2 refers to a path of movement of the robot 2 or components thereof. For example, the trajectory of the robot 2 may be the trajectory of the tip portion 5. In one example, the robot controller 3 calculates a joint angle target value (an angle target value of each joint of the robot 2) for making the position and the posture of the tip portion 5 coincide with a target value indicated by the operation program, and controls the robot 2 according to the angle target value.

At least one robot 2 executes a series of processes under the control of the robot controller 3. In the present disclosure, the series of processes is also referred to as a job. The minimum unit of processing constituting the job is referred to as a task. Thus, a job includes one or more tasks. Each robot 2 may perform various tasks such as "take parts", "place parts", "fit parts (to work)", "take standby position", etc. A task may include a path that is the trajectory of the robot 2 in the task.

In one example, the robot 2 may be a self-propelled mobile robot. In this case, prior to the start of the process, the robot 2 may move to a given position in the workspace according to the operation program. For example, the robot 2 can travel by itself while avoiding other objects. The robot 2 can repeatedly execute a job (that is, at least one task) indicated by the operation program in the arrangement indicated by the operation program.

The programming support apparatus 4 is an apparatus that generates an operation program. For example, the programming support apparatus 4 generates, for each of one or more robots 2, an operation program indicating a job to be executed by the robot 2. In one example, the programming support apparatus 4 evaluates at least some components of the job, such as the path, the pose of the robot 2 at a point in time, etc. Then, the programming support apparatus 4 generates an operation program based on the evaluation result. The programming support apparatus 4 may perform a simulation and perform its evaluation. Simulation refers to a process of virtually executing at least a part of an operation program. More specifically, the simulation refers to simulatively executing at least a part of an operation program on a computer without actually operating the robot 2. In one example, the simulation is a process of virtually executing at least a part of an operation program in a virtual space in which the robot 2 and another object are arranged. The other object is an object disposed around the robot 2 and may be, for example, another robot 2, a workpiece, another manufacturing apparatus, or the like.

[Task Flow]

In one example, the programming support apparatus 4 generates a task flow for efficiently executing a job and generates an operation program for causing one or more robots 2 to execute the task flow. In the present disclosure, a task flow refers to information indicating which robot executes which task in which order and at which timing.

In one example, a task flow includes work tasks, connection tasks, and standby tasks. The work task refers to a task set (defined) in advance by the user. The connection task refers to a task for guiding the robot 2 to the next work task and is located between adjacent work tasks. The standby task is a task for causing the robot to stand by. The standby task is set corresponding to each of the start and end of the work task, and as a result, the standby task is located between the work task and the connection task. The connection task and the standby task are automatically set (inserted) by the programming support apparatus 4.

In the present disclosure, a path in a work task is referred to as a "work path", and a path in a connection task is referred to as an "air cut path". The work path is set (defined) in advance by the user when the work task is generated. The air cut path connects the end point of the work path in the preceding work task and the start point of the work path in the following work task. In one example, the air cut path is automatically set, for example, by setting at least one teaching point other than the start point and the end point. The teaching point is a reference point set to define a path. Since the robot 2 does not move in the standby task, the standby task has no path.

Figure 2:
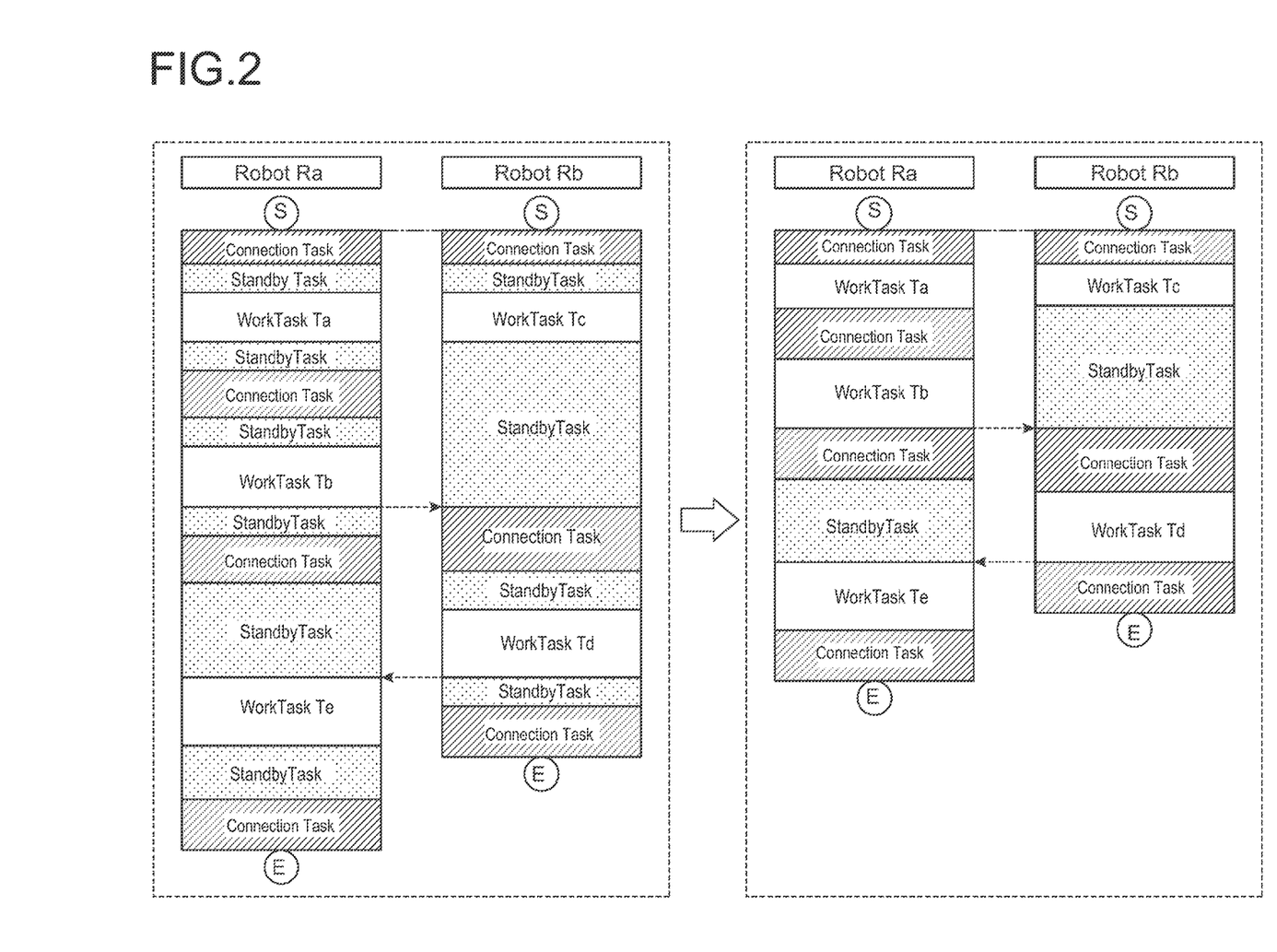
FIG. 2 is a diagram showing an example of a task flow.

FIG. 2 is a diagram illustrating an example of a task flow. The task flow in this example shows that two robots 2 (robots Ra and Rb) cooperatively execute a job including five work tasks Ta, Tb, Tc, Td, and Te. In FIG. 2, a symbol "S" indicates a start posture (initial posture) of the robot 2, and a symbol "E" indicates an end posture of the robot 2. In this example, the robot Ra executes the work tasks Ta, Tb, and Te in this order, and the robot Rb executes the work tasks Tc and Td in this order. The standby task is inserted corresponding to each of the start and end of the work task. A connection task is inserted between a standby task corresponding to the end of a preceding work task and a standby task corresponding to the start of a following work task, so that it is located between adjacent work tasks. As shown in FIG. 2, in one example, the connection task is inserted between the start posture and the standby task corresponding to the start of the first work task, and further inserted between the standby task corresponding to the end of the last work task and the end posture.

A programming support apparatus 4 generates a task flow on the basis of a concurrent execution constraint on concurrent execution of tasks by a plurality of robots 2. The concurrent execution constraint is a type of constraint (condition) imposed when the robot 2 is operated. In one example, the concurrent execution constraint indicates a timing at which a plurality of robots 2 can execute a plurality of tasks in parallel. When a plurality of robots 2 cannot execute a plurality of tasks in parallel in a certain time width (that is, when it is impossible to execute the tasks concurrently), only one robot 2 executes the task and the other robots 2 wait without executing the task in the time width. This standby is an example of interlock which is a mechanism for executing the next operation only after a given condition is satisfied.

In the example of FIG. 2, after the robot Rb executes the work task Tc, the robot Rb waits until the robot Ra finishes the work task Tb, and then executes the next joining task.

After executing the next connection task of the work task Tb, the robot Ra waits until the robot Rb finishes the work task Td, and then executes the work task Te. In this example, the time width during which the robot Ra actually waits is a period from when the connection task following the work task Tb is executed to when the work task Te is executed. The time width during which the robot Rb actually waits is a period from when the work task Tc is executed to when the next connection task is executed. A standby time greater than 0 is set for two standby tasks corresponding to these two standby times, and 0 is set as the standby time for the other standby tasks. In the standby task having the standby time of 0, the robot 2 continuously executes the adjacent work task and standby task without stopping. The right side of FIG. 2 shows a task flow in which a standby task having a standby time of 0 is omitted.

[Programming Support Apparatus]

Figure 3:
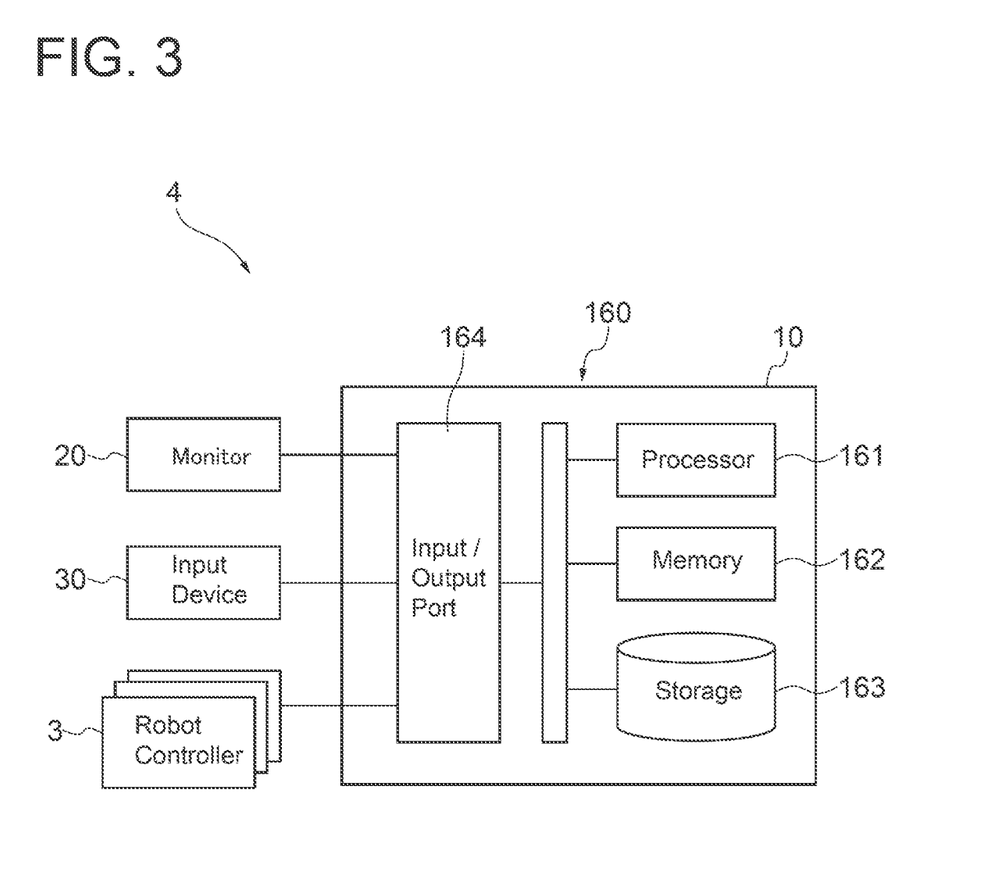
FIG. 3 is a diagram showing an example of a hardware configuration of the programming support apparatus.

FIG. 3 is a diagram illustrating an example of a hardware configuration of the programming support apparatus 4. The programming support apparatus 4 includes a main body 10, a monitor 20, and an input device 30.

The main body 10 is constituted by at least one computer. The main body 10 includes a circuit 160. The circuit 160 includes at least one processor 161, a memory 162, a storage 163, and an input/output port 164. The storage 163 records a program for configuring each module of the main body 10. The storage 163 is a computer-readable recording medium such as a hard disk, a nonvolatile semiconductor memory, a magnetic disk, or an optical disk. The memory 162 temporarily stores a program loaded from the storage 163, an operation result of the processor 161, and the like. The processor 161 constitutes each module by executing a program in cooperation with the memory 162. The input/output port 164 performs input and output of electrical signals among the monitor 20, the input device 30, and the robot controller 3 in accordance with commands from the processor 161.

The monitor 20 is a device for displaying information output from the main body 10. The monitor 20 may be of any type as long as it can display graphics, and examples thereof include a liquid crystal panel. The input device 30 is a device for inputting information to the main body 10. The input device 30 may be any device capable of inputting desired information, and examples thereof include a keypad, a mouse, and the like.

The monitor 20 and the input device 30 may be integrated as a touch panel. For example, like a tablet computer, the main body 10, the monitor 20, and the input device 30 may be integrated.

Figure 4:
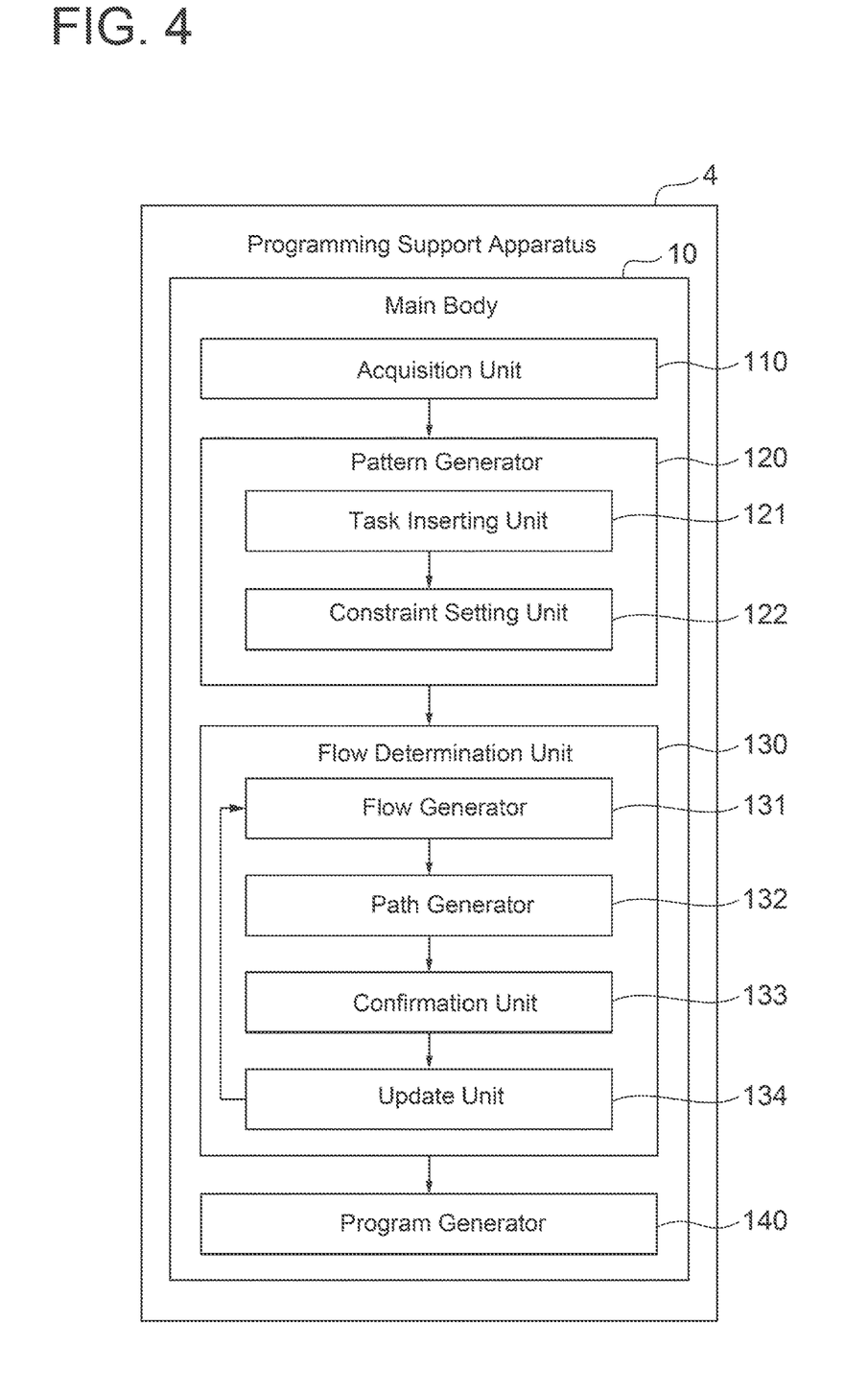
FIG. 4 is a diagram showing an example of a structure of the programming support apparatus.

FIG. 4 is a diagram showing an example of a structure of the programming support apparatus 4. In one example, the programming support apparatus 4 includes an acquisition unit 110, a pattern generator (pattern generating circuitry) 120, a flow determination unit 130, and a program generator (program generating circuitry) 140 as modules. The acquisition unit 110 is a module that acquires data necessary for generating an operation program. The pattern generator 120 is a module that generates a plurality of task patterns for one job. In the present disclosure, a task pattern refers to information indicating a job execution method that can be adopted as a task flow. In one example, each task pattern indicates a possible combination of a correspondence relationship between the robot 2 and the task and an execution order of the task. In one example, the pattern generator 120 generates a plurality of task patterns such that each task pattern includes a plurality of work tasks, a plurality of connection tasks, and a plurality of standby tasks. The flow determination unit 130 is a module that determines one task flow used to generate an operation program. The program generator 140 is a module that generates at least one operation program for causing one or more robots 2 to execute the determined task flow.

The pattern generator 120 includes a task inserting unit 121 and a constraint setting unit (constraint setting circuitry) 122. The task inserting unit 121 is a module that inserts a connection task and a standby task into each of a plurality of task patterns. Therefore, the task inserting unit 121 includes a connection task inserting unit (connection task inserting circuitry) and a standby task inserting unit (standby task inserting circuitry). The constraint setting unit 122 is a module that sets constraints in a plurality of task patterns.

The flow determination unit 130 includes a flow generator (flow generating circuitry) 131, a path generator (path generating circuitry) 132, a confirmation unit (confirmation circuitry) 133, and an update unit (update circuitry) 134. The flow generator 131 is a module that generates one task flow based on the concurrent execution constraint and a plurality of task patterns. The path generator 132 is a module that generates an air cut path in the connection task of the task flow. The confirmation unit 133 is a module that confirms whether or not the robot 2 interferes with another object in the connection task (air cut path) of the task flow. Interference refers to contact or collision between objects, for example, contact or collision of the robot 2 with another object. The update unit 134 is a module that updates, when the interference is detected, the concurrent execution constraints associated with the connection task of the generated task flow. When the update processing is performed, the flow determination unit 130 causes the flow generator 131 to regenerate the task flow based on the updated concurrent execution restriction. Therefore, the flow determination unit 130 functions as the re-execution unit.

[Planning Method]

Figure 5:
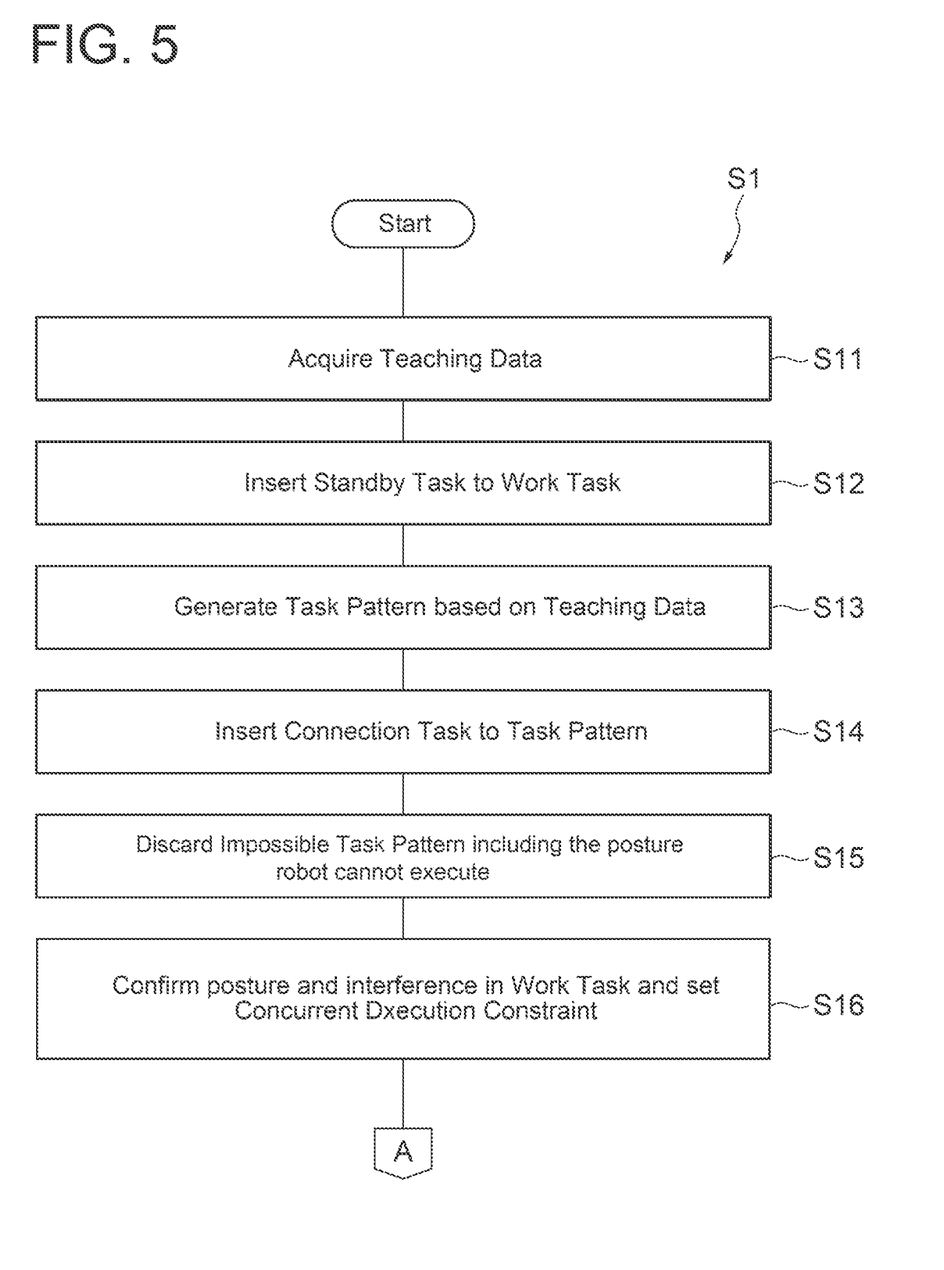
FIG. 5 is a flowchart showing an example of the operation of the programming support apparatus.
Figure 6:
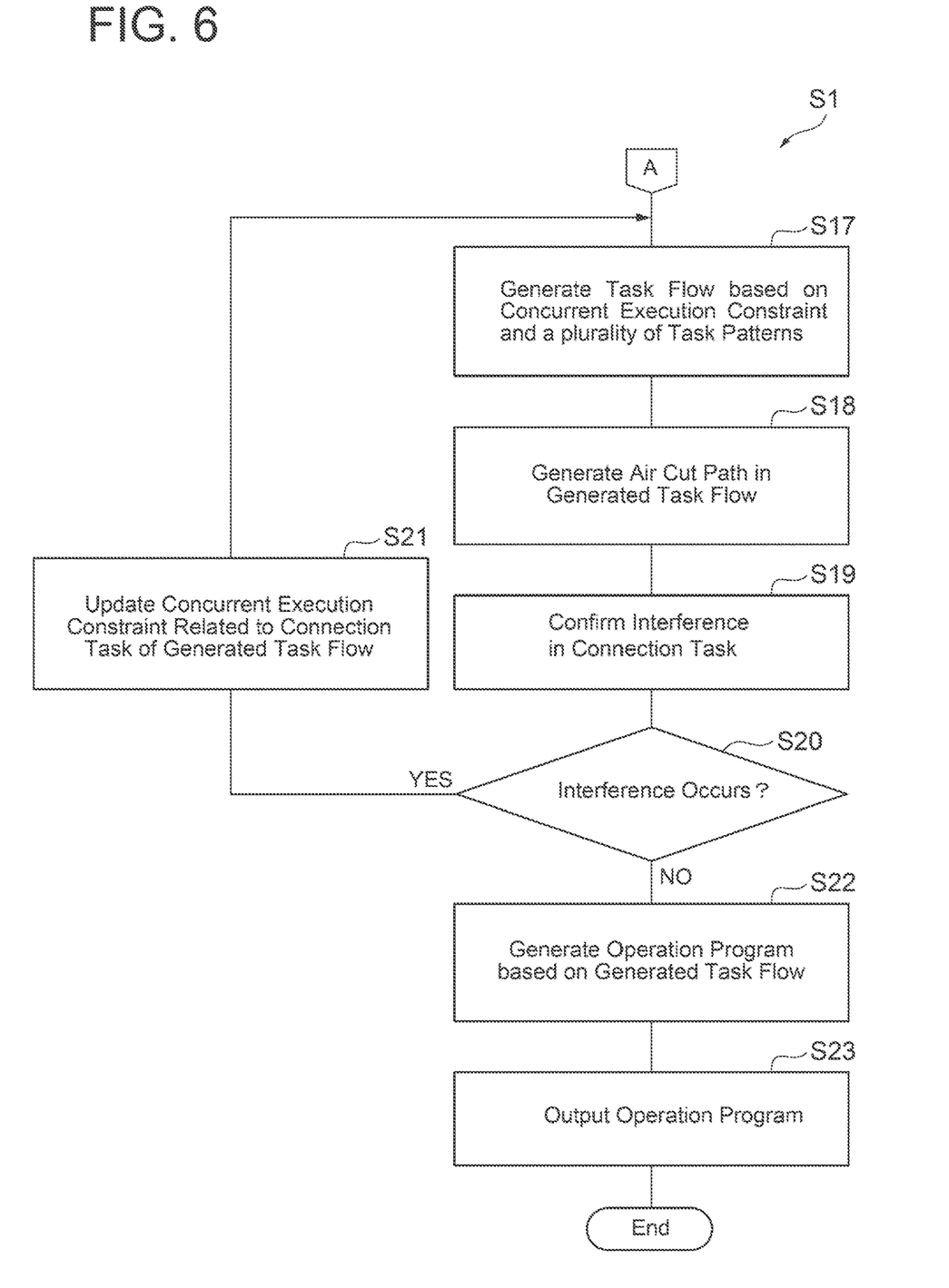
FIG. 6 is a flowchart showing an example of the operation of the programming support apparatus.

As an example of the planning method according to the present disclosure, an example of a series of processing procedures executed by the programming support apparatus 4 will be described with reference to FIGS. 5 and 6. FIGS. 5 and 6 are flowcharts showing an example of the operation of the programming support apparatus 4 as a process flow S1. That is, the programming support apparatus 4 executes the process flow S1.

In step S11, the acquisition unit 110 acquires teaching information necessary for generating an operation program. The teaching data is electronic data including information necessary for causing the robot 2 to execute a job, and indicates, for example, one or more work tasks and a restriction related to an operation of the robot 2. Examples of the constraints include an arrangement of individual robots 2, an execution order of a plurality of work tasks, a correspondence relationship between a robot 2 and a work task, an attitude of the robot 2 at each of start and end of the work task, an operation time of the robot 2 in each work task, and a concurrent execution constraint. The teaching data may include at least one of a matter individually set for each robot 2 and a matter commonly set for one or more robots 2. Various techniques may be used to obtain the teaching data. For example, the acquisition unit 110 may receive teaching data input by a user, may read teaching data from a given storage device based on a user input, or may receive indication data transmitted from another computer.

In step S12, the task inserting unit 121 inserts a standby task into each of the plurality of work tasks. For example, the task inserting unit 121 inserts a standby task at each of the start and end of a work task.

In one example, the task inserting unit 121 may set a plurality of candidate postures of the robot 2 for each of the start and the end of each work task, and execute insertion of a standby task for each of the plurality of candidate postures. The candidate posture refers to a pose prepared as an option for determining the standby posture of the robot. The candidate posture related to the start of the work task is a candidate for the standby posture of the robot 2 between the preceding connection task and the work task. The standby posture related to the end of the work task is a candidate for the standby posture of the robot 2 between the work task and the subsequent connection task. The plurality of candidate postures may include a teaching pose that is a posture of the robot 2 set (defined) by the user. In this case, the teaching data includes the teaching posture.

Figure 7:
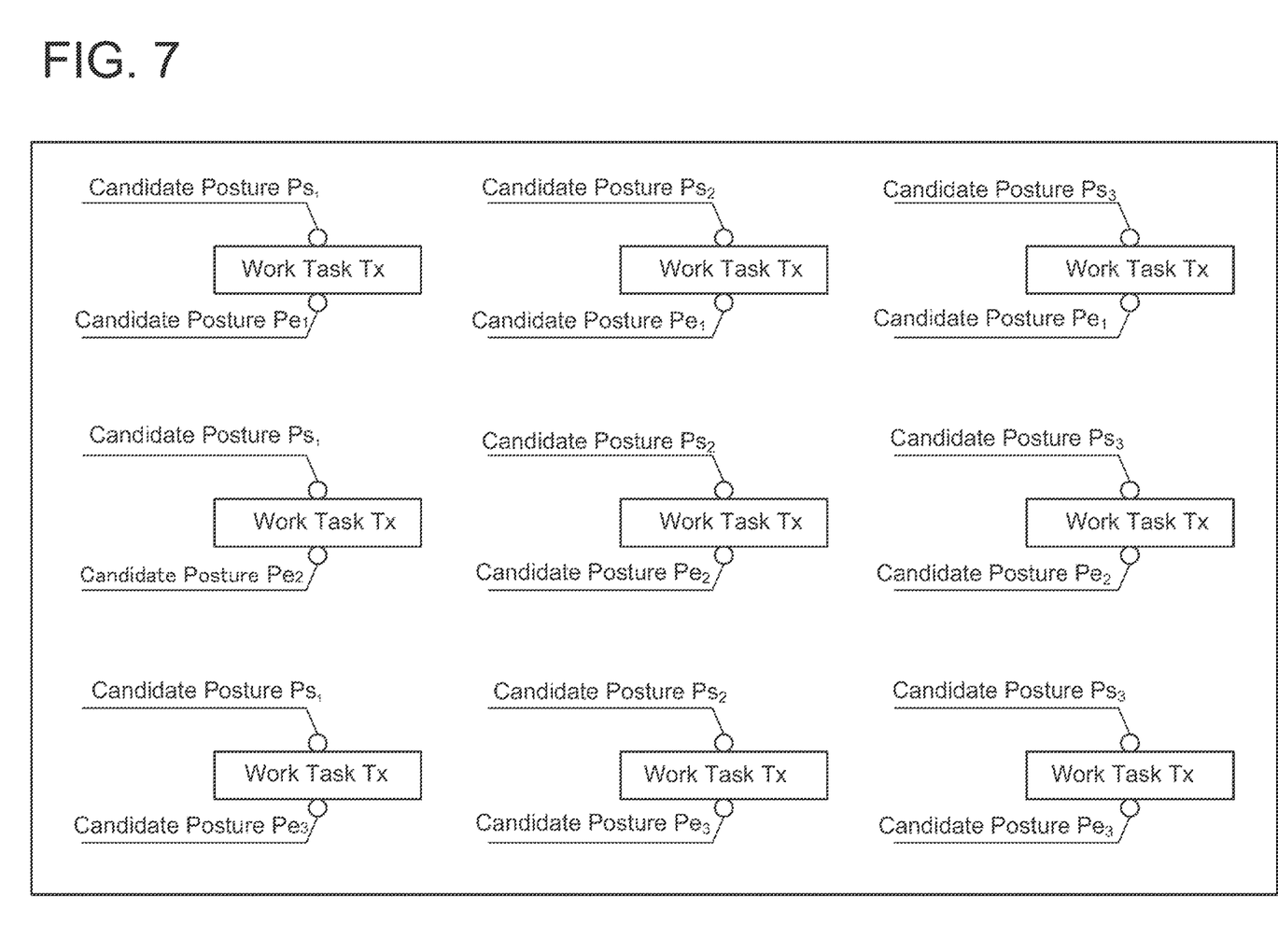
FIG. 7 is a diagram illustrating an example of insertion of a standby task based on a candidate posture.

FIG. 7 is a diagram illustrating an example of insertion of a standby task based on a candidate posture. This example shows various candidate postures for one work task Tx. It is assumed that there are three candidate postures $Ps_1$, $Ps_2$, and $Ps_3$ with respect to the start of the work task Tx, and there are three candidate postures $Pe_1$, $Pe_2$, and $Pe_3$ with respect to the end of the work task Tx. Accordingly, there are nine combinations of candidate postures for the start and end of the work task Tx. The task inserting unit 121 inserts a standby task into each of the nine combinations of the candidate postures (in other words, each of the eighteen candidate postures). The circles above and below the individual work task Tx represent its standby task.

Returning to FIG. 5, in step S13, the pattern generator 120 generates a plurality of task patterns based on the teaching information. In one example, the pattern generator 120 generates a plurality of task patterns within a range satisfying the constraint indicated by the teaching data. For example, it is assumed that no restriction is imposed on the execution order of two work tasks Tx and Ty. In this case, the pattern generator 120 can generate a task pattern in which the work task Ty is executed after the work task Tx, a task pattern in which the work task Tx is executed after the work task Ty, and a task pattern in which the work tasks Tx and Ty are executed in parallel. As another example, it is assumed that two robots Ra and Rb are prepared and no restriction is imposed on the robot that executes the work task Tx. In this case, the pattern generator 120 can generate a task pattern in which the robot Ra executes the work task Tx and a task pattern in which the robot Rb executes the work task Tx.

As described above, a plurality of candidate postures may be set for the start and end of each work task. In this case, the pattern generator 120 generates a plurality of task patterns in accordance with a combination of candidate postures of start and end of each work task. In a case where a plurality of candidate postures are set for each work task, a combination of candidate postures among the plurality of work tasks is also taken into consideration, and thus the number of task patterns to be generated increases. In the example of FIG. 7, the pattern generator 120 generates at least nine task patterns. When a plurality of candidate postures are set for each of a plurality of work tasks including the work task Tx, many task patterns are generated.

In step S14, the task inserting unit 121 inserts a connection task into each of the plurality of task patterns. The insertion of the connection task in each task pattern is executed as follows. That is, the task arrangement of the plurality of work tasks in the task pattern, the task inserting unit 121 inserts a connection task between a standby task corresponding to the end of a preceding work task and a standby task corresponding to the start of a subsequent work task. As a result, the task inserting unit 121 inserts a connection task between adjacent work tasks. In one example, the task inserting unit 121 inserts a connection task also between the start posture of the robot 2 and the standby task corresponding to the start of the first work task, and inserts a connection task also between the standby task corresponding to the end of the last work task and the end posture of the robot 2.

The task inserting unit 121 sets an initial value of the movement time of the robot 2 for each connection task of each task pattern. In the present disclosure, the movement time of the robot in the connection task is also referred to as "connecting time". The task inserting unit 121 assumes an air cut path of a straight line in each connection task, and calculates moving time of the robot 2 on the straight line. The connecting time is a time required for the robot 2 to move from the start point to the end point of the air cut path. The object passing on the air cut path may be a component of the robot 2 such as the tip portion 5 or a tool, or may be the entire robot 2. In any case, the task inserting unit 121 sets the required time as an initial value of the connection time in the connection task. This initial value is the minimum value of the connection time.

In step S15, the pattern generator 120 discards a task pattern including a posture (standby posture) that cannot be executed by the robot 2. For example, the pattern generator 120 performs the step S15 process on each candidate posture (standby posture) automatically set by the task inserting unit 121. If necessary, the pattern generator 120 may perform step S15 on the teaching posture. The "posture that cannot be executed by the robot" refers to a posture that cannot be taken by the robot or a posture that interferes with the operation of the robot. The "posture executable by the robot" refers to a posture that can be taken by the robot and does not interfere with the operation of the robot. When it is determined that the robot 2 cannot execute at least one standby posture in the task pattern, the pattern generator 120 discards the task pattern, and when it is determined that the robot 2 can execute all standby postures, the pattern generator 120 leaves the task pattern. The pattern generator 120 executes processing for each of the plurality of task patterns and extracts a task pattern that can be executed by the robot.

The posture that cannot be executed by the robot 2 may be a posture that cannot be taken by the robot 2, a posture in which the robot 2 interferes with another object (excluding another robot 2), or a posture in which there is no continuity with the posture of the robot 2 in the front-rear direction. Accordingly, the posture that can be executed by the robot 2 may be a posture that can be taken by the robot 2, a posture in which the robot 2 does not interfere with other objects (excluding other robots 2), or a posture in which continuity with the front and rear postures of the robot 2 is maintained. The continuity of the posture means that the posture of the robot 2 can transition from a certain state to the next state. A posture without continuity is a posture that cannot transition between a previous posture and/or a subsequent posture. That is, a posture without continuity is a singular point. The pattern generator 120 may determine whether or not the robot 2 can take the standby posture with reference to given specification data indicating a structure, a movable area, and the like of the robot 2. The pattern generator 120 may determine whether or not the robot 2 can execute a series of operations including the standby posture and the postures before and after the standby posture with reference to the specification data. The pattern generator 120 may compare the physical range of the robot 2 taking the standby posture with the physical range of another object and determine the overlap of the two physical ranges as interference.

In step S16, the constraint setting unit 122 confirms the posture and the interference in the work task for each of the plurality of task patterns, and sets the concurrent execution constraint. "Interference in posture and work task" refers to interference occurring between a standby posture or work task of a certain robot and a standby posture or work task of another robot. In each of the plurality of task patterns, the constraint setting unit 122 confirms whether or not interference occurs in the posture and the work task in the task pattern. When it is confirmed that the interference occurs in a certain task pattern, the constraint setting unit 122 sets the concurrent execution constraint for the task pattern based on the confirmation result so that the interference does not occur. For example, the constraint setting unit 122 sets a concurrent execution constraint for at least one element of a plurality of work tasks and a plurality of standby tasks in the task pattern.

In one example, a plurality of task patterns are generated by the processing including steps S11 to S16 described above.

Figure 8:
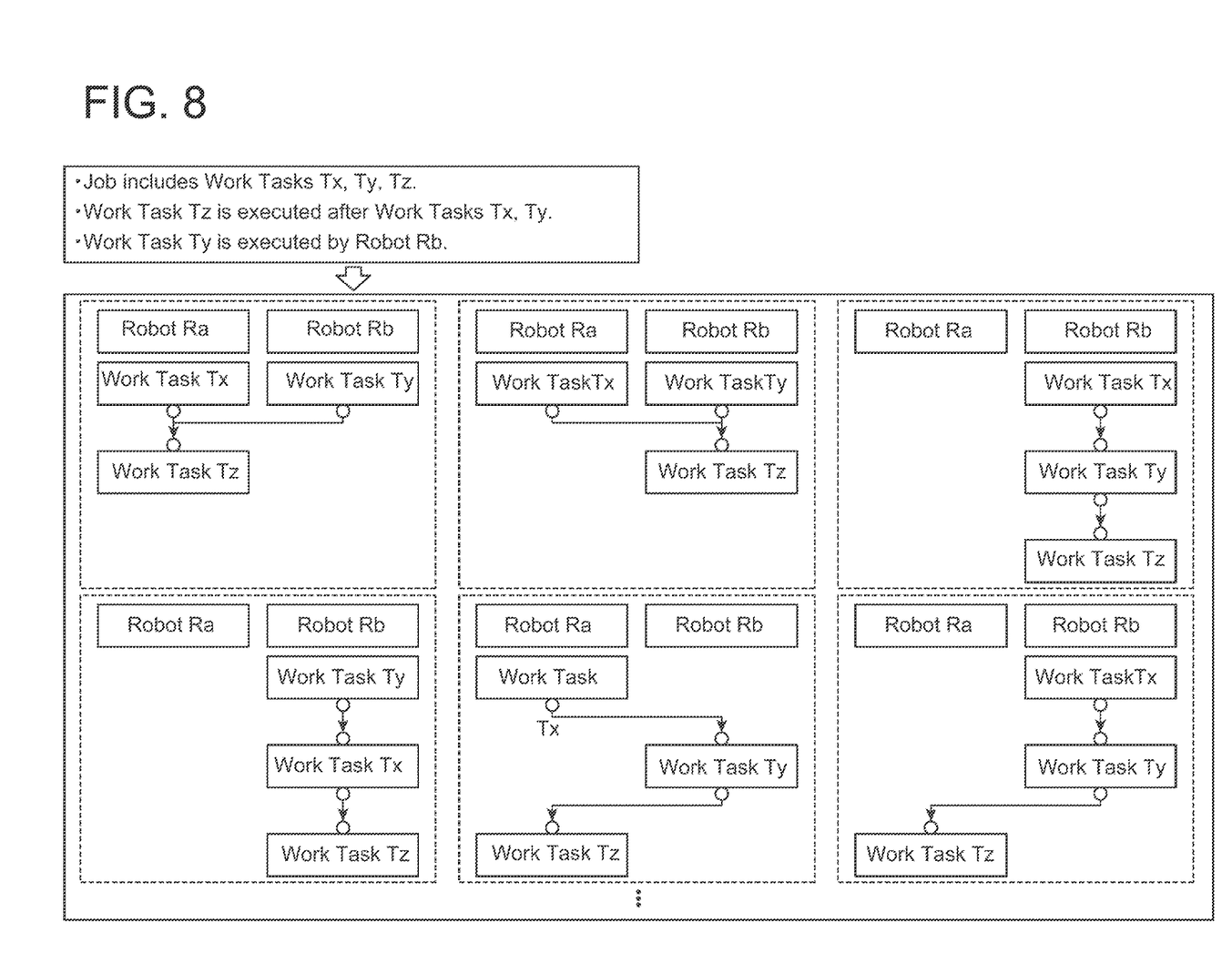
FIG. 8 is a diagram showing an example of a plurality of task patterns.

FIG. 8 is a diagram illustrating an example of a plurality of task patterns. In this example, it is assumed that two robots 2 called robots Ra and Rb are prepared and at least one robot 2 executes three work tasks Tx, Ty, and Tz. The teaching data indicates, in addition to these work tasks, a constraint on the execution order of the work tasks and a constraint on the correspondence between the robot 2 and the work tasks. In this example, the teaching data indicates that the work task Tz is executed after the work tasks Tx and Ty and that the work task Ty is executed by the robot Rb.

There is no restriction on the execution order between the work tasks Tx and Ty. Therefore, the execution timings of the work tasks Tx and Ty may overlap, the work task Tx may be executed before the work task Ty, or the work task Ty may be executed before the work task Tx. The work tasks Tx and Tz have no restrictions on their correspondence with the robot 2, so that each of these two tasks may be executed by the robot Ra or by the robot Rb. FIG. 8 shows six task patterns as part of a plurality of task patterns corresponding to such various possibilities. In this figure, circles represent standby tasks, and arrows represent connection tasks. It should be noted that yet another task pattern may be generated in the example of FIG. 8.

Referring to FIG. 6, in step S17, the flow generator 131 generates one task flow on the basis of the constraint and a plurality of task patterns. In one example, the flow generator 131 generates a task flow that satisfies a given constraint, such as a concurrent execution constraint, and has the shortest job execution time. The execution time is a time from a time point at which at least one of the one or more robots 2 starts moving from the start posture to a time point at which all of the one or more robots 2 reach the end posture.

In one example, the flow generator 131 generates one task flow by solving the traveling salesman problem based on the concurrent execution restriction of each of the plurality of task patterns. The traveling salesman problem is an optimization problem in which, when a set of nodes (cities) and travel costs between nodes are given, an agent (salesman) finds a travel route having a minimum total travel cost among a plurality of types of travel routes that travel all the nodes once. The traveling salesman problem based on the concurrent execution constraint is a process in which a plurality of robots 2 are regarded as agents, and a solution (a movement path of each agent) having the minimum total movement cost is searched while moving the plurality of agents along the time axis under the concurrent execution constraint. In the traveling salesman problem, a standby task (standby posture) of each of the plurality of robots 2 is represented by a node, and a work task and a connection task are represented by branches.

The flow generator 131 searches for a solution in which all nodes are visited by any one agent, a movement path of each agent is represented by a single stroke, and a total movement cost is minimized while moving all agents along a time axis under a constraint. The generated task flow corresponds to its optimal solution. The condition that two or more robots do not pass through the same node and the same branch corresponds to an alternative constraint that each of an individual work task, an individual connection task, and an individual standby task is executed by only one robot 2. This means that alternative constraints are automatically taken into account by solving the traveling salesman problem. In a traveling salesman problem where concurrent execution constraints are further considered, agents may not be allowed to be at different nodes or branches during the same time period even if the agents are at those locations. As described above, the task flow having the smallest total movement cost may be a task flow having the shortest execution time. The total travel cost may be defined by a physical quantity different from the execution time. For example, the task flow having the minimum total movement cost may be a task flow having a minimum total movement distance of one or more robots 2 (a sum of lengths of trajectories of the one or more robots 2).

Figure 9:
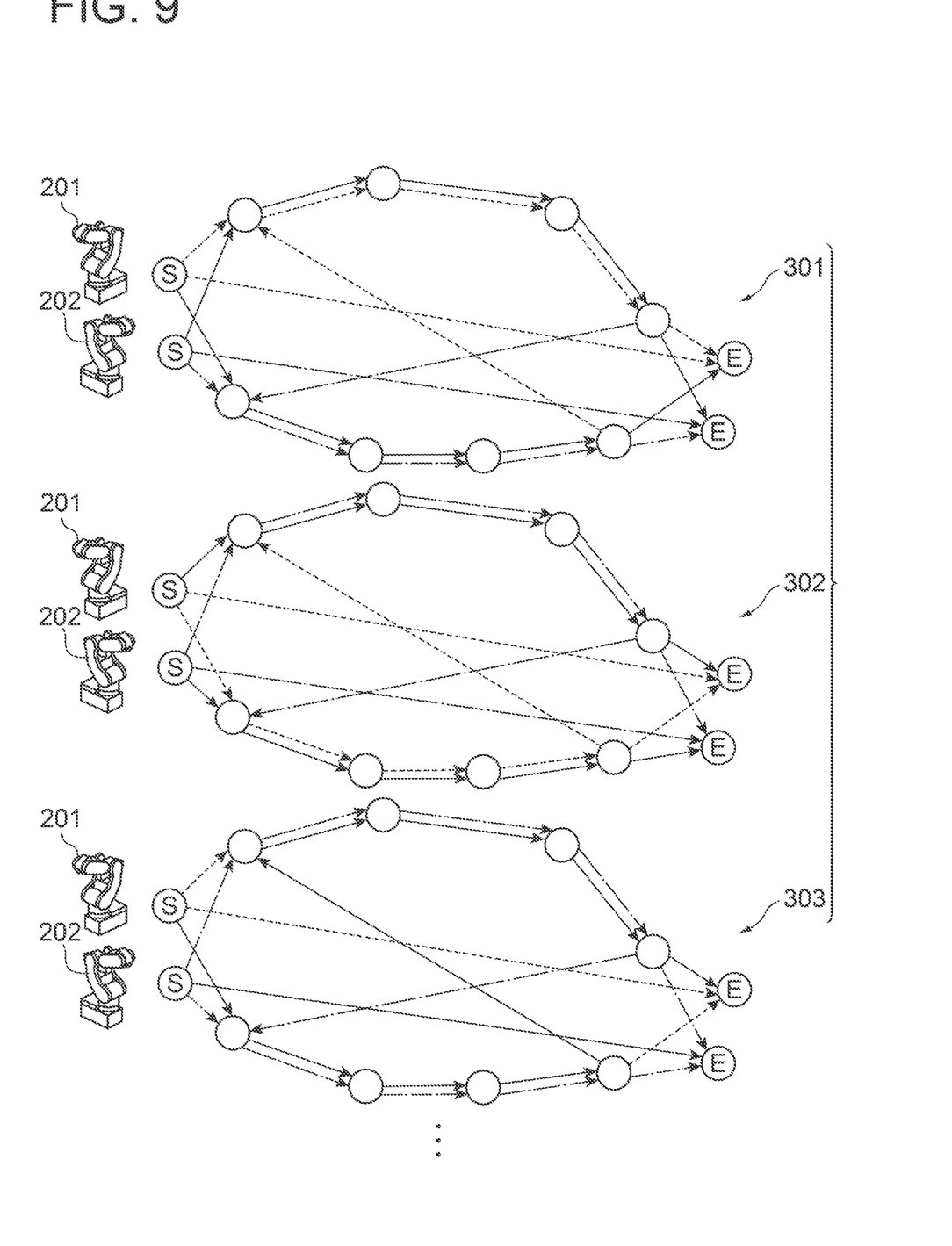
FIG. 9 is a diagram showing an example of a traveling salesman problem.

FIG. 9 is an example of a traveling salesman problem in the present disclosure. In this problem, the flow generator 131 sets two agents corresponding to two robots 2. Dashed lines indicate branches through which the robot 201 may pass (i.e., work tasks and connection tasks that the robot 201 may perform). The dashed lines indicate branches through which the robot 202 may pass (i.e., work tasks and connection tasks that may be performed by the robot 202). Each node indicates a standby task, an "S" node indicates a start posture (initial posture) of the robot 2, and an "E" node indicates an end posture of the robot 2. A set of nodes and branches represented as a traveling salesman problem corresponds to a plurality of task patterns. As illustrated in FIG. 9, the flow generator 131 searches for various solutions (task flows) such as a solution 301, 302, 303, and finally generates a task flow having a minimum total moving cost. Each of the solutions 301, 302 shows a case where each of the robots 201, 202 performs at least one work task. On the other hand, the solution 303 shows a case where the robot 201 performs all work tasks and the robot 202 does not perform any work task.

Referring back to FIG. 6, in step S18, the path generator 132 automatically generates an air cut path which is the connection task of the generated task flow. In one example, the path generator 132 generates individual air cut paths so as to avoid interference between the robot 2 and another object. For example, in order to generate one air cut path, the path generator 132 generates one or more via points for avoiding interference between the robot 2 and another object between an end point of a work path in a preceding work task and a start point of a work path in a subsequent work task. Then, the path generator 132 generates an air cut path so as to sequentially pass through the one or more via points. In order to generate one air cut path, the path generator 132 can repeatedly execute a series of processes including setting of a via point and confirmation of avoidance of interference. Details of such a generation method are described in, for example, Japanese Patent No. 4103057.

In one example, the path generator 132 generates the air cut path in the connection task of the first robot so that the first robot does not interfere with the trajectory of one or more second robots (robots other than the first robot). This processing means that the trajectory of each second robot is regarded as an obstacle for the first robot, and an air cut path of the first robot is generated so that interference does not occur between the first robot and the regarded obstacle.

In step S19, the confirmation unit 133 confirms interference in the connection task of the generated task flow. "Interference in a connection task" refers to interference occurring between a connection task of a certain robot and a work task, a connection task, or a standby posture of another robot. In one example, avoidance of interference is taken into consideration when an air cut path is generated. However, in this process, since all interference in the connection task is not confirmed, the confirmation unit 133 executes this confirmation process.

If the confirmation unit 133 confirms the interference in step S20 (that is, if interference occurs), the process proceeds to step S21. In step S21, the update unit 134 updates the concurrent execution constraint related to the connection task (air cut path) of the generated task flow. The update unit 134 updates the concurrent execution constraint so that the confirmed interference does not occur. For example, the update unit 134 may adjust a standby time corresponding to a standby task related to a connection task in which interference occurs. In one example, the confirmation unit 133 extends or shortens the standby time. The update unit 134 may adjust the standby time in the standby task preceding the connection task in which the interference is confirmed. Alternatively, the update unit 134 may adjust the standby time in the standby task of another robot 2 operating in parallel. As another example, the update unit 134 may update the connection time in the connection task in which the interference is confirmed. The update unit 134 calculates a required time for the robot 2 to pass through the generated air cut path, sets the required time as a connection time, and thereby updates the connection time of the connection task corresponding to the air cut path.

After step S21, the process returns to step S17. In the repeated step S17, the flow generator 131 regenerates one task flow. In one example, the update of the concurrent execution constraints includes at least one of an adjustment of a wait time and an update of a connection time, and the flow generator 131 regenerates one task flow based on a result of the adjustment or the update. The flow generator 131 regenerates a task flow by the same method as the first generation. However, since the concurrent execution constraint related to the connection task of the previously generated task flow has been updated, there is a possibility that the flow generator 131 generates a task flow different from the previous task flow in the repeated step S17. Alternatively, the flow generator 131 may generate the same task flow as the previous task flow. Thereafter, steps S18, S19, and S20 are executed for the regenerated task flow.

If the confirmation unit 133 does not confirm interference in the connection task in step S20 (that is, if interference does not occur), the process proceeds to step S22. In step S22, the program generator 140 generates an operation program based on the generated task flow. In one example, based on the task flow, the program generator 140 sets an execution order of individual work tasks, allocation of a plurality of work tasks to one or more robots 2 (that is, a correspondence relationship between the robots 2 and the work tasks), individual linked tasks in which an air cut path and a connection time are automatically set, and a standby time of the robot between the work task and the linked task. The program generator 140 generates at least one operation program for operating one or more robots 2 based on the setting. In one example, the program generator 140 generates, for each of the plurality of robots 2, an operation program specialized for the robot 2.

In step S23, the program generator 140 outputs the generated operation program. For example, the program generator 140 may store the operation program in a recording medium such as the storage 163 or may transmit the operation program to another computer such as the robot controller 3. Alternatively, the program generator 140 may display the operation program on the monitor 20 in the form of text, a moving image by computer graphics (CG), a still image, or the like. The programming support apparatus 4 may perform additional processing such as further interference check on the output operation program.

In one example, the program generator 140 outputs at least one operation program to at least one robot controller 3, and each robot controller 3 operates one or more robots 2 based on the operation program. Since the robot 2 that operates based on the operation program is obtained by the process flow S1, the process flow S1 is an example of a planning process according to the present disclosure and an example of a robot manufacturing process.

[Program]

Each module of the programming support apparatus 4 is realized by reading a planning program into the processor 161 or the memory 162 and causing the processor 161 to execute the program. The planning program includes code for realizing each module of the programming support apparatus 4. The processor 161 operates the input/output port 164 according to the planning program, and performs reading and writing of data in the memory 162 or the storage 163. Each module of the programming support apparatus 4 is realized by such processing.

The planning program may be provided after being fixedly recorded on a non-transitory recording medium such as a CD-ROM, a DVD-ROM, or a semiconductor memory. Alternatively, the planning program may be provided via a communication network as a data signal superimposed on a carrier wave.

[Effects]

As described above, a planning system according to an aspect of the present disclosure includes a flow generator that generates a task flow including a plurality of predefined work tasks and a connection task located between the work tasks based on concurrent execution constraints for concurrent execution of tasks by a plurality of robots, a confirmation unit 133 that confirms whether the robot interferes with another object in the connection task of the generated task flow, an update unit 134 that updates the concurrent execution constraint related to the connection task of the generated task flow when occurrence of interference is confirmed, and a re-execution unit that causes the flow generator to re-execute the task flow based on the updated concurrent execution constraint.

A planning method according to an aspect of the present disclosure is executed by a planning system including at least one processor. The planning method includes the steps of generating a task flow including a plurality of predefined work tasks and a connection task positioned between the work tasks based on concurrent execution constraints for concurrent execution of tasks by a plurality of robots, confirming whether or not the robot interferes with another object in the connection task of the generated task flow, updating the concurrent execution constraint related to the connection task of the generated task flow when occurrence of interference is confirmed, and regenerating the task flow based on the updated concurrent execution constraint.

A planning program according to an aspect of the present disclosure causes a computer to execute the steps of: generating a task flow including a plurality of predefined work tasks and a connection task located between the work tasks based on concurrent execution constraints for concurrent execution of tasks by a plurality of robots; confirming whether the robot interferes with another object in the connection task of the generated task flow; updating the concurrent execution constraint related to the connection task of the generated task flow when occurrence of interference is confirmed; and regenerating the task flow based on the updated concurrent execution constraint.

A robot system according to an aspect of the present disclosure includes one or more robots, the above-described planning system, and one or more robot controllers that operate the one or more robots based on a generated operation program.

In this aspect, since the presence or absence of interference is confirmed not for all task flows that can be employed but for task flows generated based on the concurrent execution constraint, the time spent for confirming the interference is reduced. Therefore, planning of robot control can be efficiently executed.

The planning system according to another aspect may further include a path generator configured to generate an air cut path in a connection task of the generated task flow, the confirmation unit may confirm whether or not the robot interferes with another object in the air cut path, and the update unit may update the concurrent execution constraint related to the connection task of the generated task flow when occurrence of interference is confirmed. Since the presence or absence of interference is inspected in the air cut path indicating the actual trajectory of the robot, the necessity of updating the concurrent execution constraint can be accurately determined.

In the planning system according to another aspect, the plurality of robots may include a first robot and a second robot, and the path generator may generate an air cut path in a connection task of the first robot such that the first robot does not interfere with a trajectory of the second robot. In this case, the air cut path of the processing target robot can be appropriately set so as to avoid the path of another robot that has already been set.

The planning system according to another aspect may further include a pattern generator configured to generate a plurality of task patterns including a plurality of work tasks and a connection task, and the flow generator may generate the task flow based on the concurrent execution constraint and the plurality of task patterns. Since a plurality of task patterns are automatically prepared and a task flow is generated based on these task patterns, the task flow can be efficiently obtained.

In a planning system according to another aspect, the pattern generator may include a constraint setting unit that sets, for each of a plurality of task patterns, a concurrent execution constraint on at least one of a work task and a connection task. Since the concurrent execution constraint is set for the work task or the connection task, it is possible to appropriately check processing by a plurality of robots.

In the planning system according to another aspect, the pattern generator may include a standby task inserting unit that inserts a standby task for causing the robot to stand by for the work task, and a constraint setting unit that sets a concurrent execution constraint for at least one of the work task, the connection task, and the standby task for each of the plurality of task patterns. Since a standby task is automatically inserted and a concurrent execution constraint can be set for the standby task, processing by a plurality of robots can be appropriately confirmed.

In a planning system according to another aspect, the standby task inserting unit may insert a standby task for each of a plurality of candidate postures of a robot in a work task. In this case, an efficient work process can be planned in which the standby posture of the robot is further taken into consideration.

In the planning system according to another aspect, the update unit may adjust the standby time corresponding to the standby task, and the flow generator may regenerate the task flow based on a result of the adjustment. By adjusting the standby time, the concurrent execution constraint can be appropriately updated.

In a planning system according to another aspect, the pattern generator may include a connection task inserting unit that inserts a connection task between adjacent work tasks. Since the connection task is automatically inserted, the task pattern can be efficiently generated.

In a planning system according to another aspect, the pattern generator may generate a plurality of task patterns by discarding an impossible task pattern with a posture that the robot cannot take. Since the task flow is generated based on the plurality of task patterns executable by the related robot by excluding the unrealizable task flow, the operation of the robot can be planned efficiently (for example, in a short time).

In the planning system according to another aspect, the update unit may update the connection time in the connection task based on the air cut path. By updating the connection time, the concurrent execution constraint can be appropriately updated.

In the planning system according to another aspect, the flow generator may generate a task flow having the shortest execution time. According to this method, it is possible to generate a task flow capable of completing a series of operations at the earliest time.

In the planning system according to another aspect, the flow generator may generate the task flow by solving a traveling salesman problem based on a concurrent execution constraint. By treating the process of generating a task flow as the traveling salesman problem 221, it is possible to efficiently generate a task flow capable of completing a series of operations at the lowest cost.

In the planning system according to another aspect, the flow generator may solve a traveling salesman problem in which a standby posture of each of the plurality of robots is expressed by a node and a work task and a connection task are expressed by branches. By setting the traveling salesman problem in which the standby posture is expressed by nodes and the work task and the connection task corresponding to the movement are expressed by branches, the work process by the robot can be appropriately applied to the traveling salesman problem.

In the planning system according to another aspect, the flow generator may solve the traveling salesman problem so as to satisfy a constraint that two or more robots do not pass through the same node and the same branch. In the traveling salesman problem, an alternative constraint is necessarily considered. Therefore, it is possible to efficiently generate a task flow that satisfies the alternative constraint and can complete a series of operations at the lowest cost.

The planning system according to another aspect may further include a program generator that generates an operation program for causing one or more robots to execute the task flow when it is confirmed that interference does not occur in the generated task flow. Since the presence or absence of interference is confirmed for a specific task flow, not for all task flows that can be employed, the time spent for confirming the interference is reduced. Therefore, the operation program can be efficiently generated.

In the planning system according to another aspect, the program generator may set a standby time of the robot between the work task and the connection task based on the generated task flow, and generate an operation program including the standby time. Since it is sufficient to set the standby time of the robot based on the generated task flow, the interlock can be efficiently planned.

[Modification]

The embodiments of the present disclosure have been described above in detail. However, the present disclosure is not limited to the above described above. The present disclosure can be modified in various ways without departing from the gist thereof.

The structure of the running system is not limited to the above example. The planning method according to the present disclosure may be executed using a structure different from the above-described example.

The hardware configuration of the planning system is not limited to an aspect in which each module is realized by executing a program. For example, at least a part of the above-described module group may be configured by a logic circuit specialized for the function, or may be configured by an application specific integrated circuit (ASIC) in which the logic circuit is integrated.

A processing procedure of the method executed by the at least one processor is not limited to the foregoing example. For example, a part of the above-described steps (processing) may be omitted, or each step may be executed in another order. In addition, two or more of the steps described above may be combined, or some of the steps may be modified or deleted. Alternatively, other steps may be performed in addition to the steps described above.

When the magnitude relationship between two numerical values is compared in a computer system or a computer, either of two criteria of "equal to or greater than" and "greater than" may be used, or either of two criteria of "equal to or less than" and "less than" may be used.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A planning system comprising:
   pattern generating circuitry configured to generate a plurality of task patterns including work tasks and connection tasks;
   flow generating circuitry configured to generate a task flow which includes the work tasks predetermined based on a concurrent execution constraint with respect to concurrent execution of tasks performed by a plurality of robots and the plurality of task patterns;
   confirmation circuitry configured to determine whether at least one robot of the robots interferes with an object in the connection tasks;
   update circuitry configured to update the concurrent execution constraint when the at least one robot of the robots is determined to interfere with the object; and
   program generating circuitry to generate and output an operation program causing the robots to execute the task flow when the confirmation circuitry determines the at least one robot does not interfere with the object,
   wherein the flow generating circuitry is configured to generate the task flow based on the concurrent execution constraint and the plurality of task patterns, and
   wherein the pattern generating circuitry comprises
      standby task inserting circuitry that is configured to insert standby tasks causing the at least one robot to stand by for the work tasks, and
      constraint setting circuitry that is configured to set the concurrent execution constraint with respect to at least one of the standby tasks for each of the plurality of task patterns.

2. The planning system according to claim 1, further comprising:
   path generating circuitry configured to generate an air cut path in each of the connection tasks,
   wherein the confirmation circuitry is configured to determine whether the at least one robot interferes with the object in the air cut path.

3. The planning system according to claim 2,
   wherein the robots include a first robot and a second robot, and
   wherein the path generating circuitry is configured to generate the air cut path in each of the connection tasks of the first robot so that the first robot does not interfere with a path of the second robot.

4. The planning system according to claim 1, wherein the pattern generating circuitry includes constraint setting circuitry that is configured to set, with respect to each of the plurality of task patterns, the concurrent execution constraint for at least one of the work tasks and the connection tasks.

5. The planning system according to claim 1, wherein the standby task inserting circuitry is configured to insert the standby tasks with respect to each of a plurality of candidate postures of each of the robots in the work tasks.

6. The planning system according to claim 1, wherein the update circuitry is configured to adjust a standby time of the standby tasks.

7. The planning system according to claim 1, wherein the pattern generating circuitry includes connection task inserting circuitry that is configured to insert the connection task between the adjacent work tasks.

8. The planning system according to claim 1, wherein the pattern generating circuitry is configured to discard at least one impossible task pattern with a posture that the at least one robot cannot take.

9. The planning system according to claim 2, wherein the update circuitry is configured to update the connection time in each of the connection tasks based on the air cut path.

10. The planning system according to claim 1, wherein the flow generating circuitry is configured to generate the task flow to minimize execution time to execute the task flow.

11. The planning system according to claim 1, wherein the flow generating circuitry is configured to solve a traveling salesman problem based on the concurrent execution constraint to generate the task flow.

12. The planning system according to claim 11, wherein the flow generating circuitry is configured to solve the traveling salesman problem in which a standby posture of each of the robots is expressed by a node, and the work tasks and the connection tasks are expressed by branches.

13. The planning system according to claim 12, wherein the flow generating circuitry is configured to solve the traveling salesman problem so as to satisfy a constraint that the robots do not pass through the same node and the same branch.

14. The planning system according to claim 1, wherein the program generating circuitry is configured to set a standby time of the at least one robot between the work task and the connection task based on the task flow, and configured to generate the operation program including the standby time.

15. A robot system comprising:
at least one robot;
pattern generating circuitry configured to generate a plurality of task patterns including work tasks and connection tasks;
flow generating circuitry configured to generate a task flow which includes the work tasks predetermined based on a concurrent execution constraint with respect to concurrent execution of tasks performed by the at least one robot and the plurality of task patterns;
confirmation circuitry configured to determine whether the at least one robot interferes with an object in the connection tasks;
update circuitry configured to update the concurrent execution constraint when the at least one robot is determined to interfere with the object;
program generating circuitry configured to generate and output an operation program causing the at least one robot to execute the task flow when the confirmation circuitry determines the at least one robot does not interfere with the object; and
at least one robot controller configured to operate the at least one robot based on the operation program,
wherein the flow generating circuitry is configured to generate the task flow based on the concurrent execution constraint and the plurality of task patterns, and
wherein the pattern generating circuitry comprises
standby task inserting circuitry that is configured to insert standby tasks causing the at least one robot to stand by for the work tasks, and
constraint setting circuitry that is configured to set the concurrent execution constraint with respect to at least one of the standby tasks for each of the plurality of task patterns.

16. A planning method executed by a planning system including at least one processor, comprising:
generating a plurality of task patterns including work tasks and connection tasks;
generating a task flow which includes the work tasks predetermined based on a concurrent execution constraint with respect to concurrent execution of tasks performed by a plurality of robots and the plurality of task patterns;
determining whether at least one robot of the robots interferes with an object in the connection tasks;
updating the concurrent execution constraint when the at least one robot of the robots is determined to interfere with the object; and
generating and outputting an operation program causing the robots to execute the task flow when it is determined that the at least one robot does not interfere with the object,
wherein the task flow is generated based on the concurrent execution constraint and the plurality of task patterns, and
wherein the plurality of task patterns are generated by
inserting standby tasks causing the at least one robot to stand by for the work tasks, and
setting the concurrent execution constraint with respect to at least one of the standby tasks for each of the plurality of task patterns.

17. A non-transitory computer readable storage medium retrievably storing a computer-executable program therein, the computer-executable program causing a computer to perform a planning method, the method comprising:
generating a plurality of task patterns including work tasks and connection tasks;
generating a task flow which includes the work tasks predetermined based on a concurrent execution constraint with respect to concurrent execution of tasks performed by a plurality of robots and the plurality of task patterns;
determining whether at least one robot of the robots interferes with an object in the connection tasks;
updating the concurrent execution constraint when the at least one robot of the robots is determined to interfere with the object; and
generating and outputting an operation program causing the robots to execute the task flow when it is determined that the at least one robot does not interfere with the object,
wherein the task flow is generated based on the concurrent execution constraint and the plurality of task patterns, and
wherein the plurality of task patterns are generated by
inserting standby tasks causing the at least one robot to stand by for the work tasks, and
setting the concurrent execution constraint with respect to at least one of the standby tasks for each of the plurality of task patterns.

18. The planning system according to claim 1, wherein the object is another robot of the plurality of robots.

19. The planning system according to claim 1, wherein the standby task includes a standby posture of the at least one robot.

* * * * *